Patented Aug. 8, 1944

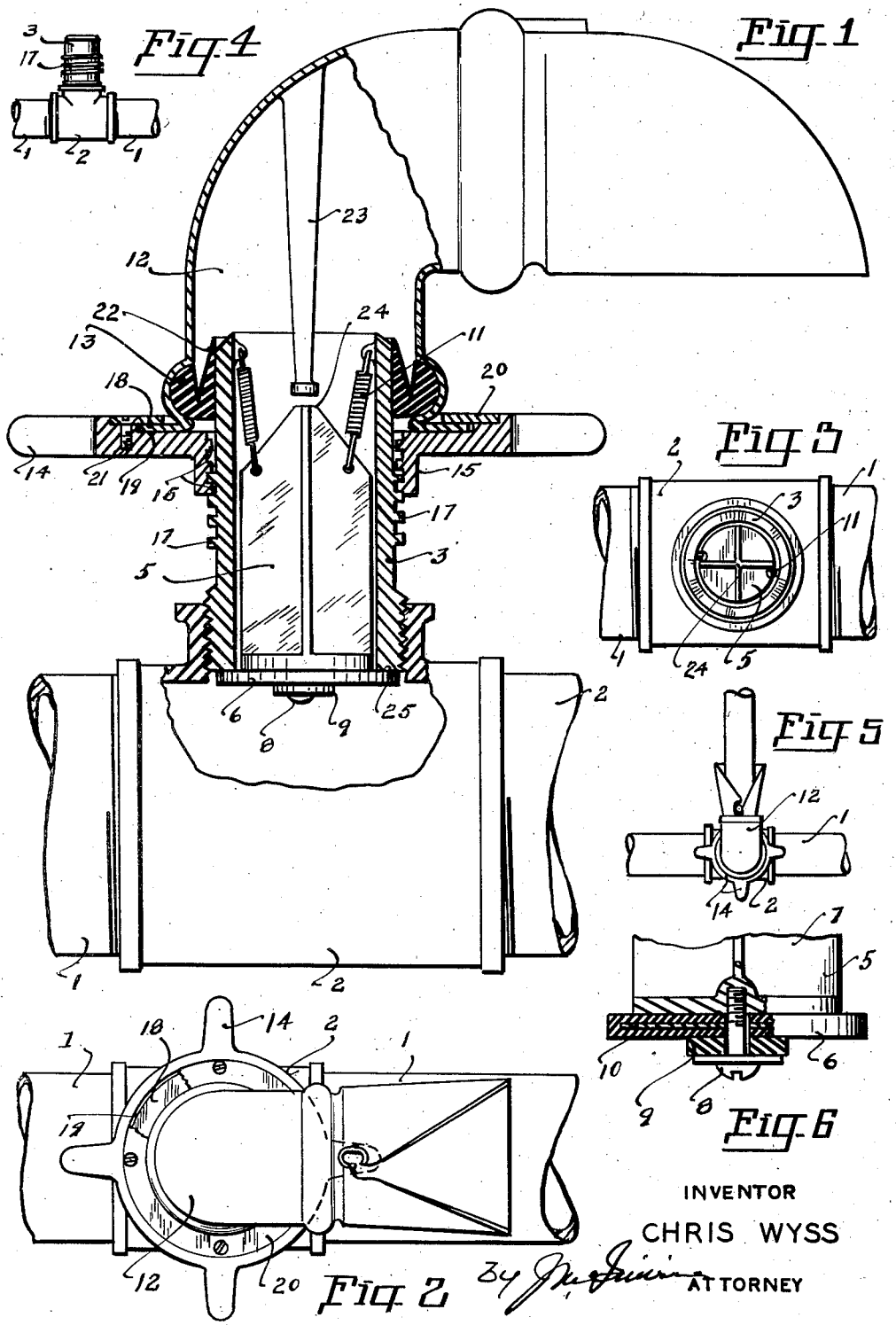

2,355,408

UNITED STATES PATENT OFFICE 2,355,408

VALVE AND PIPE CONNECTION

Chris Wyss, Tillamook, Oreg.

Application April 28, 1943, Serial No. 484,900

1 Claim. (Cl. 284—17)

This invention relates to improvements in valve and pipe connections. The primary object of the invention is to provide a valve and pipe connection that will open the valve to any desired opening after the connection has been made.

In my new and improved valve pipe connection, the pipe is first connected, completing a liquid seal within the connection, the valve can then be opened by a hand wheel to any desired opening. In irrigation pipe lines my valve and pipe connection will permit the connecting of all branch pipe lines to the main line before the valves are opened, preventing sudden overloads on the pumping system.

Referring to the drawing:

Figure 1 is a detailed cut away view of my new and improved valve and pipe connection.

Figure 2 is a plan view of Figure 1.

Figure 3 is a plan view of the male member of my new and improved valve and pipe fitting with the branch line removed.

Figure 4 is a side elevation of the male fitting, including the valve mechanism, located on a main pipe line.

Figure 5 is a plan view of the assembled valve and pipe connection.

Figure 6 is a fragmentary broken away detail of a preferred form of valve construction.

In the drawing:

A main line pipe 1 and T fitting 2 have an outwardly extending nipple or male member 3 screwed into the fitting 2 at 4 for receiving branch line connections. A floating valve 5 is longitudinally disposed within the nipple or male member 3. This valve consists of a semi-flexible disc 6 secured to the lower end of the frame 7 by a suitable holding means, as bolt 8.

To insure the proper seating of the disc 6 against its seat 6A a flexible washer 9 is inserted under the bolt 8, as best illustrated in Figure 6. A reenforcing plate 10 is provided within the disc 6 for maintaining its shape. The valve assembly is returned to seated position by springs 11. The water pressure within the pipe line 1 also maintains the disc 6 against its seat.

A female pipe fitting 12 has a liquid seal member 13 for engaging the nipple 3. The female fitting is held to the nipple by the hand wheel 14, having internal threads 15 within its hub 16 for engaging the threads 17 of the nipple 3. The flange 18 of the fitting 12 is inserted within a recess 19 of the hand wheel 14 and is maintained therein by an annular plate 20 secured to the hand wheel by fastening means, as screws 21.

In the operation of my new and improved valve pipe connection, the female fitting 12 is placed over the nipple 3, best illustrated in Figure 1. When the liquid seal 13 surrounds the fitting 3 a seal has been provided as soon as liquid is allowed to enter the fitting 12. The water pressure within the fitting will force the flexible member 22 or the seal against the nipple, at the same time permitting longitudinal movement of the seal along the member 3. The seal 13 is already a patented type of seal, for which I make no claim, except that it is the one type of seal that will most effectively carry out the spirit of my invention.

The handwheel 14 is rotated until the threads 14 and 16 engage with one another. The connection has thus been completed. By further rotating the hand wheel in a direction for causing the threads to pull the fitting 12 downward over the nipple, an inwardly extending valve push rod 23 will contact the upper end 24 of the valve body, pushing it longitudinally of the nipple disengaging the valve disc 6 from the valve seat 25, allowing liquid to enter the nipple and into the fitting 12. The number of revolutions the hand wheel is rotated in a direction to open the valve will determine the amount of valve opening, but at any location relative to the valve travel the liquid seal about the nipple will be constantly maintained. This is the primary object and feature of my invention, as in other types of valves the liquid seal cannot be maintained until the valve has been completely opened.

Where a liquid seal can be maintained at any determined amount of valve opening, the complete irrigation system can be most effectively operated with the least amount of shock and wear on the equipment and requiring a minimum of the operator's time and attention.

I do not wish to be limited to the mechanical structure as illustrated, as other types of mechanical embodiment could be applied, still coming within the scope of my claim.

What I claim is:

A combined valve and fitting between a branch pipe and a main pipe, including a nipple section connected at one end to the main pipe and having a valve normally closing the connection between the main pipe and nipple, said fitting including a terminal of the branch pipe having free sliding and sealing connection with the nipple remote from the main pipe and formed with a lateral annular flange, a hand wheel encircling the nipple and having threaded connection therewith, said wheel being recessed to receive said flange, and a plate overlying the flange and secured to the hand wheel to connect the hand wheel and branch pipe against other than relative rotary movement, the rotary movement of the hand wheel relative to the nipple compelling direct longitudinal non-rotary movement of the branch pipe, and means in said branch pipe to cooperate with and control the position of the nipple valve in such longitudinal movement of the branch pipe.

CHRIS WYSS.